United States Patent [19]
Pohl

[11] Patent Number: 4,722,019
[45] Date of Patent: * Jan. 26, 1988

[54] PROTECTION METHODS AND SYSTEMS FOR REFRIGERATION SYSTEMS SUITABLE FOR A VARIETY OF DIFFERENT MODELS

[75] Inventor: Walter J. Pohl, Louisville, Ky.

[73] Assignee: General Electric Company, Louisville, Ky.

[*] Notice: The portion of the term of this patent subsequent to Jan. 26, 2005 has been disclaimed.

[21] Appl. No.: 778,075

[22] Filed: Sep. 20, 1985

[51] Int. Cl.$^4$ ............................................. H02H 7/08
[52] U.S. Cl. ........................................ 361/22; 361/29; 361/33; 361/86; 318/782; 318/445
[58] Field of Search .................. 361/22, 23, 28, 29, 361/33, 72, 86, 88-92; 318/805, 812, 806, 432, 434; 62/129, 230; 340/648, 661, 662, 663; 364/483

[56] References Cited

U.S. PATENT DOCUMENTS

| | | | |
|---|---|---|---|
| 3,671,830 | 6/1972 | Kruper | 318/221 |
| 3,875,487 | 4/1975 | White | 361/29 X |
| 4,038,061 | 7/1977 | Anderson et al. | 62/126 |
| 4,079,432 | 3/1978 | Godfrey | 361/23 |
| 4,084,204 | 4/1978 | Jacubus, Jr. | 361/72 |
| 4,123,792 | 10/1978 | Gephart et al. | 307/126 |
| 4,176,396 | 11/1979 | Howatt | 364/551 |
| 4,196,462 | 4/1980 | Pohl | 361/33 |
| 4,197,532 | 4/1980 | Lawson, II | 340/648 |
| 4,240,072 | 12/1980 | Fowler | 340/664 |
| 4,251,872 | 2/1981 | Bone | 364/551 |
| 4,253,130 | 2/1981 | Newell | 361/22 |
| 4,286,303 | 2/1981 | Genheimer et al. | 361/24 |
| 4,581,900 | 4/1986 | Lowe et al. | 62/129 X |

Primary Examiner—Philip H. Leung
Assistant Examiner—Todd E. DeBoer
Attorney, Agent, or Firm—H. Neil Houser; Radford M. Reams

[57] ABSTRACT

Calibrated methods and systems for protecting refrigerant motor/compressors against overload and loss of refrigerant conditions, independent of compressor and system size, while avoiding the need for a plurality of sensors. The disclosed methods and systems are generic in the sense that they may be employed in a variety of different air conditioner or heat pump models of different sizes and capacities, without being specifically tailored for a particular model, although a factory calibration adjustment is required. The disclosed methods and systems sense loading on the compressor motor, and make control decisions based thereon. A permanent compressor motor reference loading is established when the refrigeration system has a known correct refrigerant charge and the motor/compressor has a known load. This is typically accomplished in the factory after a predetermined stabilization interval has elapsed following initial start up of the motor/compressor. During operation thereafter, at least a representation of prevailing compressor motor loading is at least periodically sensed. A low-load condition indicative of a loss of refrigerant or of insufficient evaporator airflow is recognized if the prevailing loading is less than a low load threshold loading established as a first predetermined function of the permanent reference loading. A high load condition indicative of an excessive load on the motor/compressor is recognized if the prevailing loading exceeds a high load threshold loading established as a second predetermined function of the permanent reference loading. In either case, the motor/compressor is deenergized.

6 Claims, 9 Drawing Figures

PROTECTION METHODS AND SYSTEMS FOR REFRIGERATION SYSTEMS SUITABLE FOR A VARIETY OF DIFFERENT MODELS

BACKGROUND OF THE INVENTION

The present invention relates to methods and systems for protecting motor/compressors in refrigeration systems, including air conditioners and heat pumps, which protection methods and systems avoid the need for expensive sensors and which are capable of functioning in a variety of refrigeration system models. In this regard, the protection methods and systems of the present invention may be termed "generic" in that a single system is capable of serving a large number of different models, of widely differing capacities.

The present invention is particularly concerned with refrigeration systems of the type employed in air conditioners and heat pumps for cooling and heating living spaces. Such units are available in a wide variety of physical configurations and capacities, including small room air conditioners; self-contained reversible heat pump systems which somewhat resemble room air conditioners, but which provide both heating and cooling; central air conditioning systems which employ an indoor evaporator and a separate outdoor compressor/condenser combination; and similarly-configured heat pump systems which provide both heating and cooling by means of a reversible refrigeration system.

Such refrigeration systems, while apparently simple to control, in fact require fairly sophisticated control systems if proper operation and protection from damage under a wide variety of operating conditions, often adverse, are to be achieved.

A basic form of protection for a refrigerant motor/compressor is overload protection. Such protection is typically provided by a thermal or overcurrent sensor. In addition to overload protection, the early detection of loss of refrigerant is highly desirable, particularly in central systems which have several physically-separated components interconnected by hermetic piping having a number of joints subject to leakage. Leaks not only allow refrigerant to escape; they also allow the ingress of air and moisture. Such eventually oxidizes oil in the system, resulting in the formation of tar-like substances which damage the compressor and block restriction devices. Thus, the ingress of air and moisture into a refrigeration system is very damaging if the system is allowed to continue to run. Resulting system contamination gives rise to continued problems even after repair of the leak and refrigerant (e.g. freon) recharge has been accomplished.

Typical prior art control systems for protecting refrigeration systems employ a number of sensors so that the control system is provided with sufficient information upon which to base control decisions. For detecting leaks, a pressure sensor is typically provided on the compressor suction line. This is a relatively costly solution.

Another adverse condition is a simple high load condition, which can result when power line voltage is excessively low (a so-called "brown out" condition), or when operating under extreme ambient temperature conditions. Thus, on an extremely hot day, an air conditioning system may be subjected to both high load and low voltage. This tends to make the motor inefficient, which leads to overheating. Under such operating conditions, it is desirable to de-energize the compressor before damage results, and then allow operation to resume after a cooling-off interval.

By way of more specific example, various motor and compressor protection systems are disclosed in the following U.S. Patents: Anderson et al U.S. Pat. No. 4,038,061; Godfrey U.S. Pat. No. 4,079,432; Newell U.S. Pat. No. 4,253,130; and Genheimer et al U.S. Pat. No. 4,286,303. Of these, Anderson and Newell disclose relatively comprehensive systems for protecting air conditioners and heat pumps, and employ a variety of current and temperature sensors. Godfrey and Genheimer et al disclose motor protection systems in general which include the function of allowing a motor to attempt a restart following an overload, but only for a limited number of times.

Another approach to motor protection, particularly for a refrigeration system compressor motor, is disclosed in commonly-assigned Pohl U.S. Pat. No. 4,196,462. As disclosed in that patent, a single-phase AC induction motor of the type employing a capacitor-run winding can be protected from overload (including locked-rotor) and overspeed conditions by monitoring the voltage across the capacitor-run winding. Under heavy loading conditions, the winding voltage decreases. This can be sensed, and used to initiate appropriate protection measures, such as a timed cooling-off interval.

From the foregoing brief background, it will be appreciated that prior art protection and control systems not only require a relatively large number of diverse sensors, but also must be particularly adjusted to the size of the unit involved. Thus, overcurrent protection sized for a small air conditioner would be entirely inappropriate for a large one. By way of example, a typical product line may have from twenty to thirty different models, each requiring a customized control system.

While not prior art with respect to the present invention, it may be noted that related protection systems and methods are disclosed and claimed in commonly-assigned application Ser. No. 778,076, filed Sept. 20, 1986, by Walter J. Pohl and entitled "Self-Calibrating Control Methods and Systems for Refrigeration Systems" and now U.S. Pat. No. 4,653,285. Very briefly, the systems described in application Ser. No. 778,076 sense loading on the compressor motor, preferably by sensing the voltage across the capacitor-run winding of an AC induction motor and normalizing with respect to line voltage. A self-calibrating protection capability is implemented by utilizing the changing load as a function of time on the compressor motor during both normal and abnormal operation of a refrigeration system. More particularly, a reference value of compressor motor loading is determined and stored shortly after the start of each compressor ON cycle by allowing a stabilization interval (typically thirty seconds) to elapse, and then sensing loading and storing the sensed loading as the reference value to be used for the remainder of that particular ON cycle. In the preferred forms, it is the ratio of capacitor-run winding voltage to line voltage which is sensed and stored as a reference ratio. Thereafter, during each particular ON cycle, in order to recognize high load conditions, prevailing compressor loading is at least periodically sensed and compared to the stored reference. If the thus-sensed motor loading has increased above a high-load threshold, then a high load condition is recognized, and the compressor motor is de-energized for a timed cooling off interval. In the preferred forms, it is then-prevailing ratio of capacitor-run winding voltage to line voltage which is sensed and compared to the stored reference ratio. The compressor motor is de-energized if the then-prevailing ratio falls below a high-loaded threshold ratio established as a predetermined fraction of the reference ratio, typically 0.8 times the reference ratio.

The approach disclosed in Ser. No. 778,076 can be made self-calibrating, and compressor motor protection afforded regardless of the size of the motor, since the motor control system establishes its own reference based on the characteristics of the particular motor.

The systems and methods of Ser. No. 778,076 do not, however, provide protection against loss of refrigerant conditions, such as result from a leak.

More particularly, the power-up self-calibration technique of the above-referenced Ser. No. 778,076 cannot reliably be used to detect slow leak conditions resulting in a gradual decrease in motor/compressor load. The reason is that a slow leak of refrigerant can take effect gradually over a period of months. Each time the motor/compressor is turned ON, the self-calibration reference is shifted upward.

SUMMARY OF THE INVENTION

Accordingly, it is an object of the invention to provide alternative systems and methods for protecting refrigeration systems.

It is another object of the invention to provide such protection systems and methods which are generic in the sense that they may be employed in a variety of different air conditioner or heat pump models without being specifically tailored for a particular model, or even for a particular individual unit.

It is another object of the invention to provide such protection systems and methods which are capable not only of detecting compressor motor overload conditions, but of detecting refrigerant leaks.

It is another object of the invention to provide such control systems and methods which avoid the need for a variety of specialized sensors.

In accordance with the invention, it is recognized that a loss of refrigerant, such as would be caused by a leak, is reflected by a decreased load on the motor-compressor, which decreased load is less than the minimum load which would normally be encountered during proper operation. In accordance with the invention, such a condition is detected, and appropriate action is taken to avoid damage.

An unduly light load on a motor/compressor also occurs if airflow over the refrigerant evaporator is blocked, such as would be caused by a blocked filter. Therefore, the methods and systems of the present invention also inherently provide protection against this condition as well.

In accordance with the present invention, a permanent reference is established for each particular system in the factory, when the system is new, operating with a known correct refrigerant charge, and under a known load. The permanent reference is established after a timed stabilization interval has been allowed to elapse during which start-up transients, liquid slugging effects, and the like have dissipated, but before the compressor is significantly loaded as a result of pressure buildup.

The permanent reference thus established is stored. In the case of a microprocessor-based electronic control system, the reference can be stored in a non-volatile random access memory such as an electrically programmable read only memory (EPROM) or an electrically alterable read only memory (EAROM). Alternatively, the reference can be stored by means of a potentiometer setting, concealed from user adjustment thereafter.

While the systems and methods of the invention thus require a calibration step, the technique still may be characterized as "generic" in the sense that a single control system may be employed in a variety of different air conditioner or heat pump models, without being specifically tailored for a particular model, or a particular individual unit. Moreover, protection is afforded without the need for providing a variety of sensors.

More particularly, in accordance with the invention there is provided a calibrated method for protecting a refrigerant motor/compressor in a closed-circuit refrigeration system against loss of refrigerant and overload conditions independent of compressor and system size. The refrigeration system is the type having a compressor, a condensor and an evaporator connected in series. Typically, the refrigeration system is cycled ON and OFF during operation, and the compressor is driven by a single-phase induction motor supplied from an AC power line and of type including a capacitor/run winding.

The method of the invention includes the step of establishing a permanent compressor motor reference loading when the refrigeration system has a known correct refrigerant charge and the motor/compressor has a known load. This step of establishing a permanent compressor/motor reference loading is normally accomplished in the factory after a predetermined stabilization interval has elapsed following the initial start up of the motor/compressor. The stabilization interval is predetermined within the approximate range of from five seconds to five minutes; a typical interval is thirty seconds.

The method of the invention comprises the further step of during operation thereafter at least periodically sensing at least a representation of prevailing compressor motor loading, recognizing a low-load condition indicative of a loss of refrigerant or of insufficient evaporator airflow if the prevailing loading is less than a low load threshold loading established as a first predetermined function of the permanent reference loading, and recognizing a high load condition indicative of an excessive load on the motor/compressor if the prevailing loading exceeds a high load threshold loading established as a second predetermined function of the permanent reference loading. The motor/compressor is also de-energized in the event either a low load or a high load condition is recognized.

In the case of the refrigeration system which is cycled ON and OFF during operation, the periodic sensing of at least a representation of prevailing compressor motor loading is done during each ON cycle.

In the case of a compressor driven by a single-phase induction motor supplied from an AC power line and the type including a capacitor-run winding, the permanent compressor motor reference loading is established by sensing the ratio of capacitor-run winding voltage to line voltage, and storing at least a representation of the sensed ratio as a permanent compressor motor reference ratio. Thereafter, during each ON cycle, at least periodically the prevailing ratio of capacitor-run winding voltage to line voltage is sensed. A low-load condition is recognized if the prevailing ratio exceeds a low-load ratio established as a first predetermined function of the permanent reference ratio, and a high load condition is recognized if the prevailing ratio is less than a high load threshold ratio established as a second predetermined function of the permanent reference ratio.

In accordance with the method of the invention, there may be an additional step of determining whether the motor/compressor has failed to start at the beginning of an ON cycle by allowing a compressor motor equilibrium speed interval to elapse, and then sensing prevailing compressor motor loading. The motor/compressor is de-energized if the prevailing loading exceeds the high load threshold loading.

While the specific actions are dependent on a variety of design considerations, in the event of a low load condition indicative of either loss of refrigerant or evaporator filter blockage, an appropriate response is to de-energize the motor/compressor for a delay interval, and then allow the system to restart, but only for a limited number of times, for example six. When the thus-limited restart count is reached, the system is permanently stopped until serviced by a qualified technician.

In the case of a high load condition being recognized, response is similar, but no restart count is maintained. In other words, each time the high load condition exists, the motor/compressor is allowed to cool down, and to then to restart. Overheating damage to the motor/compressor is thereby avoided, while still maintaining operation of the system within the constraints of the high-load condition.

In the event a locked-rotor condition is recognized whereby the motor/compressor fails to start at all, an appropriate response is to de-energize the motor/compressor, allow a delay interval to elapse, and then allow a limited-number of restart attempts. Although a restart count is thus maintained, after three consecutive minutes of operation without a fault, the restart counter can be reset.

The invention also provides a calibrated system for protecting a refrigerant compressor in a closed-circuit refrigeration system against loss of refrigerant and overload conditions independent of compressor and system size. Advantageously, the compressor is driven by a single-phase induction motor supplied from an AC power line and the type including a capacitor-run winding, and a refrigeration system has a condensor and an evaporator connected in series with the compressor.

The control system includes a switching element for cycling the refrigeration system ON and OFF by energizing and de-energizing the compressor motor.

A sensing element is included for sensing at least a representation of compressor motor loading. In the preferred forms, this sensing element comprises sensing means for sensing the ratio of capacitor/run winding voltage to a AC line voltage.

A storage element is provided for storing a permanent compressor motor reference loading established when the refrigeration system has a known correct refrigerant charge and the motor compressor has a known load. In the preferred forms, this storage element stores a permanent compressor/motor reference ratio established as the ratio of capacitor-run winding voltage to line voltage.

The control system also includes means connected to the sensing and switching elements for, during each ON cycle, at least periodically sensing at least a representation of prevailing compressor motor loading, recognizing a low-load condition indicative of a loss of refrigerant or of insufficient evaporator airflow and de-energizing the compressor motor if the prevailing loading is less than a low-load threshold loading established as a first predetermined function of the permanent reference loading, and recognizing a high-load condition indicative of an excessive load on the motor compressor and de-energizing the compressor motor if prevailing loading exceeds a high load threshold loading established as a second predetermined function of the permanent reference loading.

In two typical embodiments, the storage element comprises an adjustable potentiometer and a digital memory, respectively.

In the case where the storage element stores a permanent motor compressor reference ratio established as the ratio of capacitor-run winding voltage to line voltage, a means is connected to the sensing means and to the switching element for, during each ON cycle, at least periodically sensing the prevailing ratio of capacitor-run winding voltage to line voltage, recognizing a low-load condition indicative of a loss of refrigerant or of insufficient evaporator airflow and de-energizing the compressor motor if the prevailing ratio exceeds a low load threshold ratio established as a first predetermined function of the permanent reference ratio, and recognizing a high-load condition indicative of an excessive load on a motor/compressor and de-energizing the compressor motor if the prevailing ratio is less than a high-load threshold established as a second predetermined function of the permanent reference ratio.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings in which:

DETAILED DESCRIPTION

Figure 1:
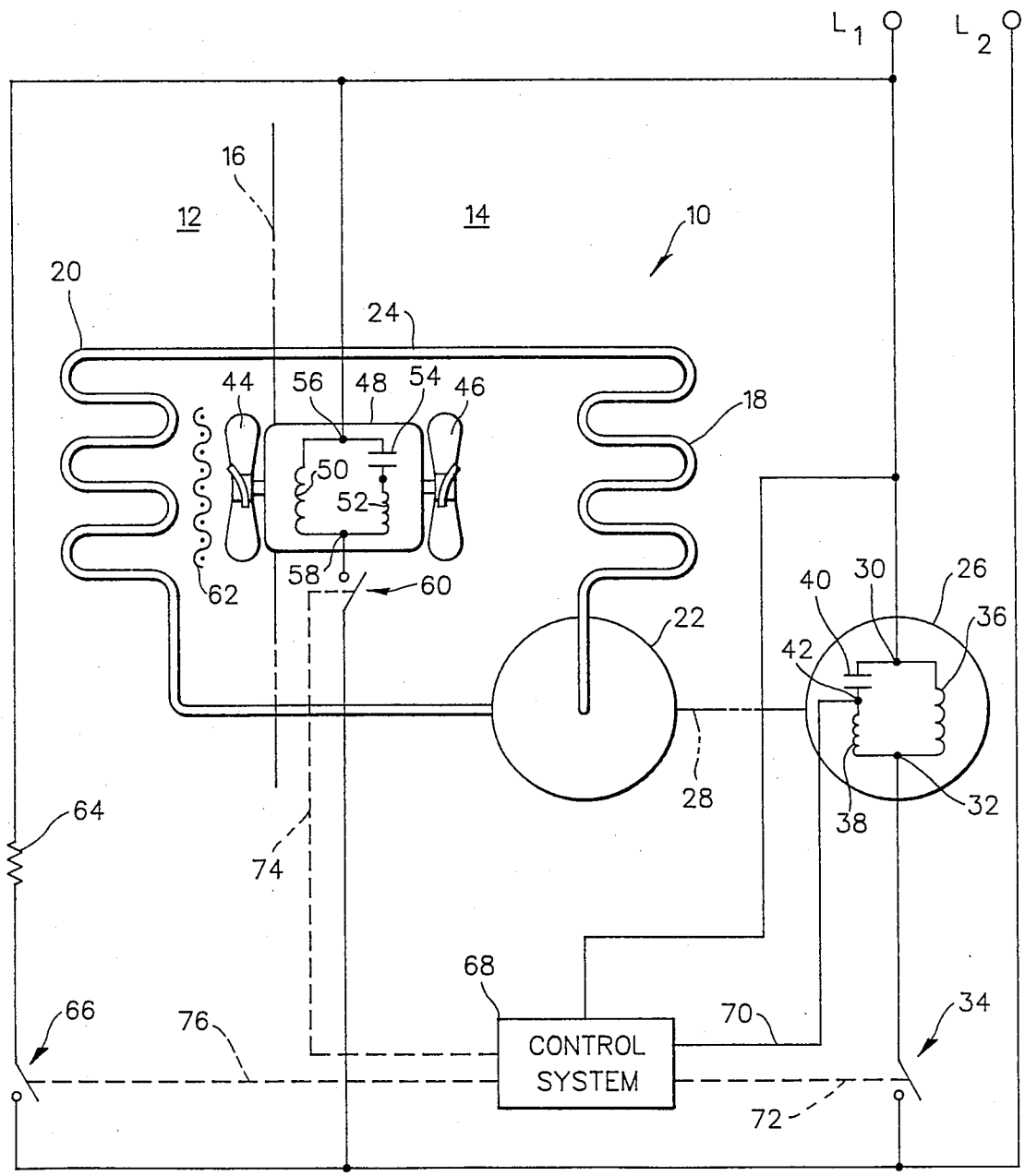
FIG. 1 is a diagrammatic view of a closed circuit refrigeration system such as may be employed in a room heating and cooling unit which employs a refrigeration system for cooling and an electric heater for heating.

With reference now to FIG. 1, shown in highly schematic form is a representative closed circuit refrigeration system 10, typical of a self-contained room heating and cooling unit. The system is divided into an indoor side 12 and an outdoor side 14 by a partition 16. The refrigeration system 10 includes an outdoor condenser 18, an indoor evaporator 20, and a refrigerant compressor 22 for circulating refrigerant through the system. Although not illustrated, it will be appreciated that the refrigeration system 10 also requires a suitable flow restricting or expansion device somewhere in a line 24 between the condenser 18 and the evaporator 20, such as a capillary tube or an expansion valve.

The refrigerant compressor 22 is driven by a single-phase AC induction motor 26 via a shaft represented at 28. In nearly all cases, the compressor 22 and the motor 26 are included within a hermetically sealed enclosure (not shown in FIG. 1). The compressor motor 26 has a pair of AC power input terminals 30 and 32 supplied from AC power lines $L_1$ and $L_2$, respectively, via a controlled switching element 34 connected between line $L_2$ and terminal 32. As schematically depicted, the motor 26 is of the type including a run winding 36 connected directly to the terminals 30 and 32, and a split phase capacitor-run winding 38 connected permanently in series with a capacitor 40 across the terminals 30 and 32.

While any suitable technique may be employed for sensing motor loading, the presently-preferred technique is to sense voltage across the capacitor-run winding 38 at a terminal 42, which is referenced to the terminal 32 when the controlled switching element 34 is closed.

Air circulation over the condenser 18 and evaporator 20 is provided by a pair of fan blades 44 and 46, respectively, driven by a common fan motor 48, which is also an AC induction motor of the type having a run winding 50 and a capacitor-run winding 52 in series with a capacitor 54. The motor 48 has terminals 56 and 58 to which AC power is supplied from $L_1$ and $L_2$ via a controlled switching element 60 connected between line $L_2$ and the terminal 58. For removing particulate matter from room air circulated past the evaporator 20, a suitable filter 62 is provided. Although the filter 62 may be physically located anywhere in the air circulation path, for representative purposes only it is shown positioned between the fan 46 and the evaporator 20.

Heating when desired is provided by an electrical resistance heater 64 supplied from lines $L_1$ and $L_2$ via a controlled switching element 66 connected to the line $L_2$. While the refrigeration system 10 depicted in FIG. 1 operates to provide cooling only, it will be appreciated that, with the addition of a reversing valve (not shown) and other conventional components, the system may comprise a reverse cycle heat pump system which provides heating as well as cooling, and that the principles of the invention would be equally applicable. In such a case, it will further be appreciated that the heater 64 would be employed for auxiliary purposes, such as when outdoor ambient temperatures are too low for efficient heat pump operation.

The remaining element depicted in FIG. 1 is a control system 68 which serves a number of functions, including that of motor/compressor protection. The control system 68, via line 70, senses the voltage across the capacitor-run winding 38 of the compressor motor 26. In addition, the control system 68 activates the controlled switching elements 34 and 60 via respective control paths represented at 72 and 74 for energizing the motors 26 and 48, as well as the controlled switching element 66 via a control path represented at 76 for energizing the heater 64.

In addition to the motor protection aspect to which the present invention is directed, it will be appreciated that the control system 68 also typically effects thermostatic control by cycling the motor 26 and thus the compressor 22 ON and OFF as required, or, alternatively, the heater 64. For this purpose, it will be appreciated that the control system 68 also includes at least one temperature sensing element (not shown), and a means for user temperature set point adjustment.

During operation, high pressure refrigerant gas from the compressor 22 is directed into the condenser 18, and therein condensed by air circulated past the condenser 18 by the fan 44. Liquid refrigerant then flows from the condenser 18 to the evaporator 20 via the line 24, including the suitable flow-restricting expansion device (not shown). Within the evaporator 20, liquid refrigerant vaporizes to produce a cooling effect, and then returns to the compressor 22. Evaporator fan 46 circulates room air past the evaporator 20 and through the filter 62.

Figure 2:
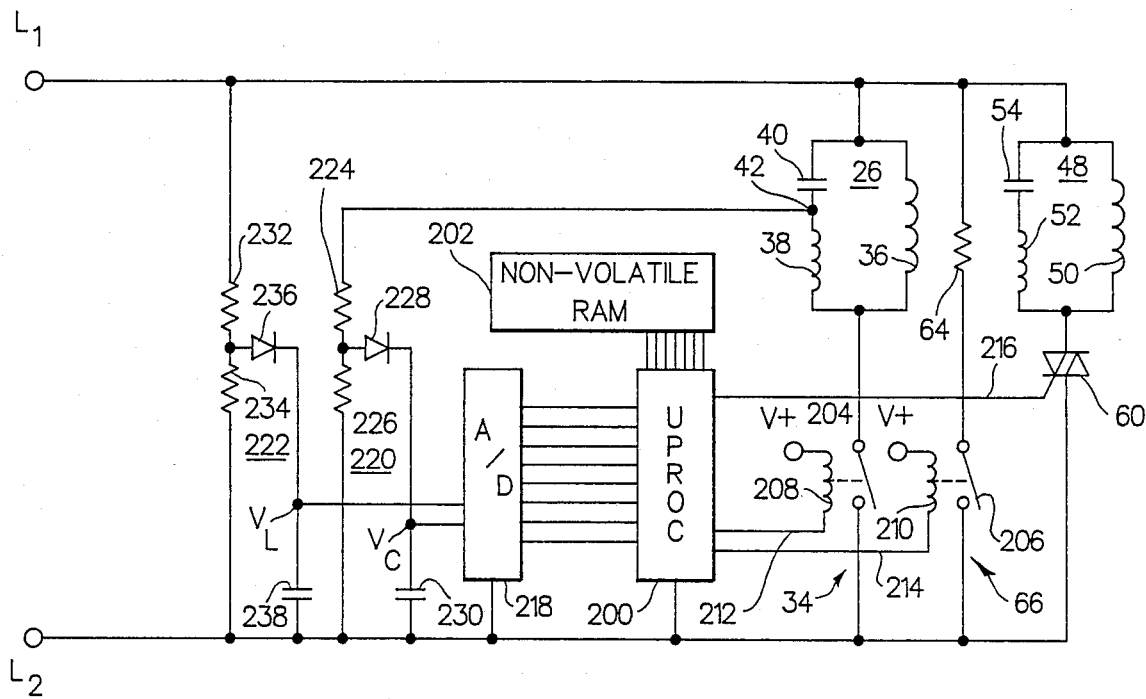
FIG. 2 is an electrical schematic circuit diagram depicting one form of control system applied to the refrigeration system of FIG. 1, the FIG. 2 control system employing a non-volatile random-access memory for storing a representation of a permanent compressor motor reference loading.

FIG. 2 depicts in greater detail a suitable control system, generally designated 68, applied to the refrigeration system of FIG. 1. The FIG. 2 control system is microprocessor-based, and thus includes a suitable microprocessor or microcontroller 200 operating under stored program control in a matter well known to those skilled in the art. While a variety of microprocessor systems may be employed, one which is suitable is a Motorola Semiconductor Type No. M6805 Single-Chip N-Channel Microcontroller which includes, within a single integrated circuit device, program ROM, RAM, a CPU and a variety of I/O line drivers.

Connected to the microprocessor 200 is a non-volatile storage device 202, represented as non-volatile Random-Access Memory (RAM). The storage device 202 must be capable of retaining digital data over an extended period of time, even without power, and of having data stored therein at least once. While a conventional RAM with battery back-up can be employed as the storage device 202, the requirements are perhaps better served by available memory devices known as Electrically-Programmable Read-Only Memories (EPROMs) and Electrically-Alterable Read-Only Memories (EAROMS).

In FIG. 2, the controlled switching elements 34 and 66 of FIG. 1 more particularly may be seen to comprise relays having respective contacts 204 and 206, and respective coils 208 and 210 driven by output lines 212 and 214 from the microcontroller 200. Although not illustrated, in view of the drive requirements of the coils 208 and 210, switching transistors are typically included in series with the lines 212 and 214. Similarly, the FIG. 1 switching element 60 for the relatively lower-current fan motor 48 in FIG. 2 more particularly may be seen to comprise a triac 60 driven directly by another output line 216 of the microcontroller 200. Thus, the microcontroller 200 can selectively control the compressor and fan motors 26 and 48, as well as the heater 64.

For input sensing, connected to the microcontroller 200 is an input-multiplexed analog-to-digital (A/D) converter 218. Any suitable A/D converter 218 can be employed. The resolution should be such that, over the range of voltages expected during operation, a change in voltage at least as small as 2% of the range will be recognized. For presenting analog inputs to the A/D converter 218, two conditioning circuits 220 and 222 are included, each comprising a voltage divider for scaling sensed voltage to a lower level, a rectifier, and a filter capacitor. More particularly, the conditioning circuit 220 comprises voltage divider resistors 224 and 226, diode 228 and capacitor 230; and the conditioning circuit 222 comprises voltage divider resistors 232 and 234, diode 236 and capacitor 238.

During operation, the conditioning circuits 220 and 222 serve to sample with reference to $L_2$ voltage at the corresponding circuit node 42 or $L_1$, rectify the voltage, and store it as a respective representative voltage sample $V_C$ or $V_L$ across respective capacitive 230 or 238. The two voltage samples, $V_C$ and $V_L$ are respectively for the compressor motor 26 capacitor-run winding 38 voltage and AC line voltage. The circuit time constants are such that the capacitors 230 and 238 hold the DC voltage samples for a time consistent with the sampling interval of the A/D converter 218 and microcontroller 200, which is typically 100 ms. A time constant in the order of 0.5 second is typical.

It will be appreciated that equivalent results may be achieved by various other circuit arrangements.

Figure 2A:
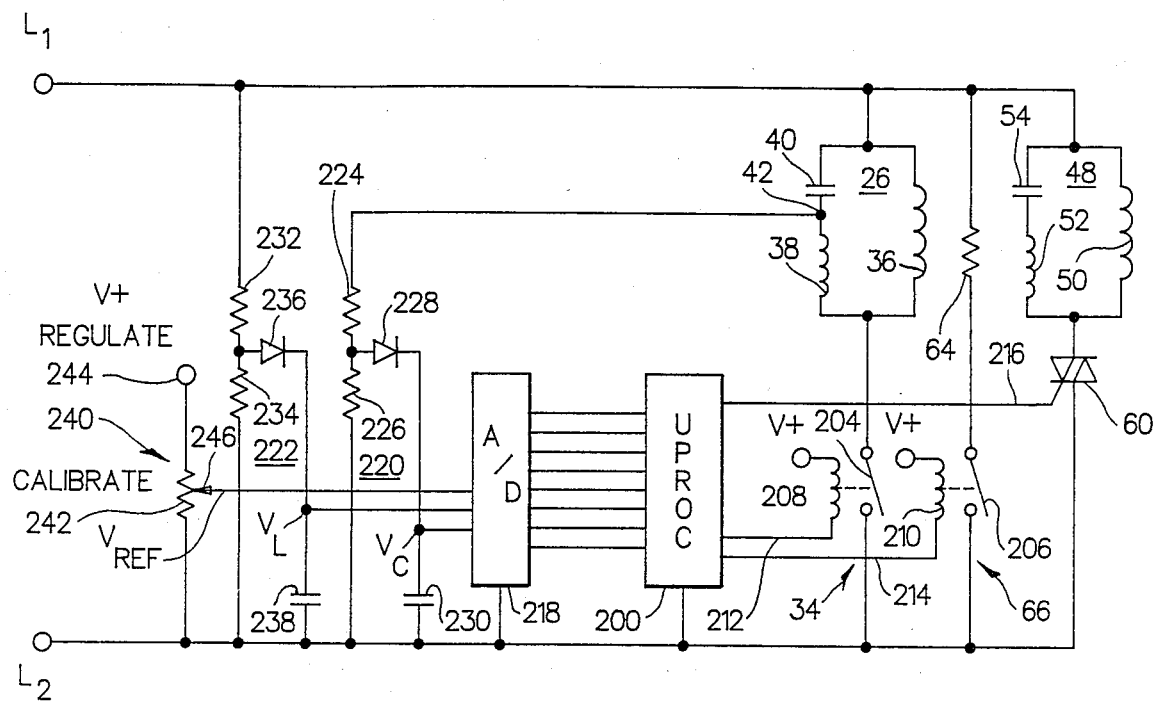
FIG. 2A is an electrical schematic circuit diagram similar to FIG. 2 alternatively employing a potentiometer setting for storing a representation of a permanent compressor motor reference loading.

In the circuitry of FIG. 2, it will be appreciated that the non-volatile RAM 202 serves as a storage element for storing a permanent compressor/motor reference loading established when the refrigerations system has a known correct refrigerant charge and the motor 26/compressor 22 (FIG. 1) has a known load. Shown FIG. 2A, otherwise identical to FIG. 2, is an alternative storage element 240 comprising an adjustable potentiometer 242 connected to a source represented at 244 of regulated DC voltage, and with an adjustable tap point 246 connected via a $V_{REF}$ line to an input of the A/D converter 218. When this alternative form 240 of storage element is employed, the non-volatile RAM 202 is not employed. In any case, the alternative form of storage element 240 comprising a potentiometer 246 is less expensive than providing a non-volatile RAM 202.

Figure 3:
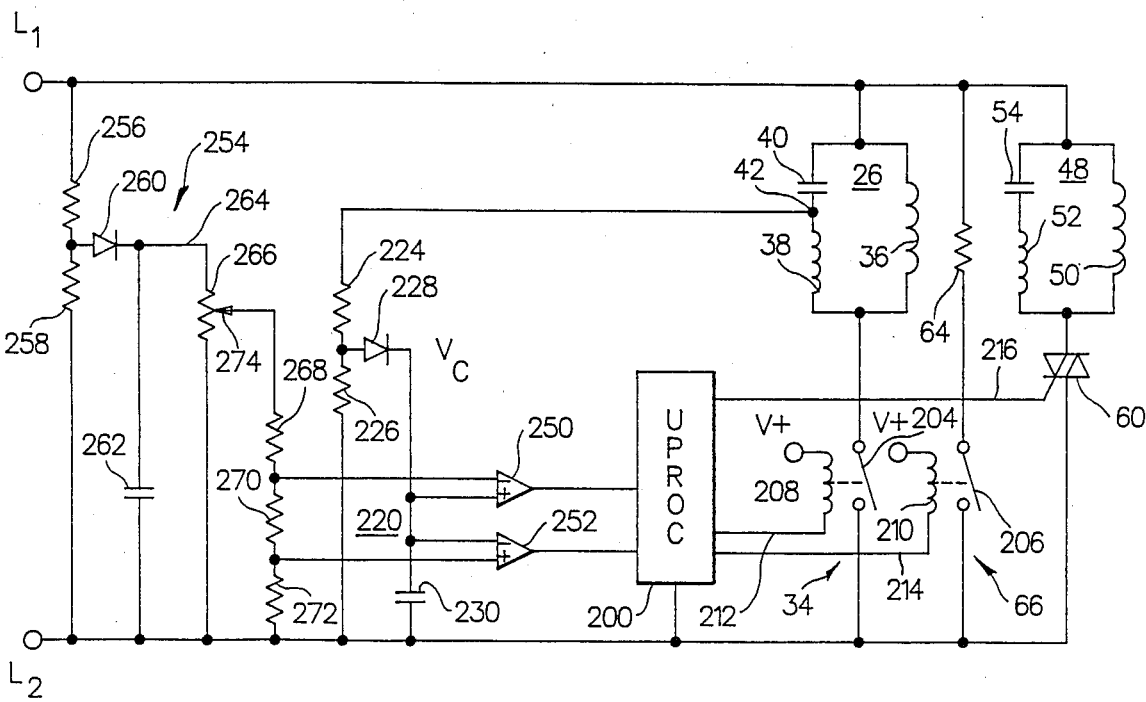
FIG. 3 is an electrical schematic circuit diagram employing an alternative form of control system applied to the refrigeration system of FIG. 1, the FIG. 3 control system avoiding the need for an analog-to-digital converter.

With reference now to FIG. 3, depicted is an alternative form of control circuit which employs a pair of comparators 250 and 252 and avoids the need for an analog-to-digital converter to process analog inputs representing the line voltage $V_L$ the capacitor-run winding voltage $V_C$, and possibly the reference voltage $V_{REF}$, all as in FIG. 2. In the circuit of FIG. 3, in effect the ratios of $V_C$ to $V_L$ are maintained as line voltage varies, since an input to the comparators is derived from line voltage. $V_L$ per se is not directly sensed.

In FIG. 3, the comparator 250 supplies a HIGH LIMIT FAULT line to the microprocessor 200, while the comparator 252 supplies a LOW LIMIT FAULT line, both without a requirement for A/D conversion.

More particularly, in FIG. 3 the conditioning circuit 220 of FIG. 2 is retained. The voltage $V_C$ dependent on capacitor-run winding voltage is applied, as a signal input, to the non-inverting (+) input of comparator 250 and to the inverting (−) input of the comparator 252. The HIGH LIMIT FAULT output of the comparator 250 thus goes to logic high when $V_C$ exceeds HIGH LIMIT REFERENCE, and the LOW LIMIT FAULT output of the caparator 252 thus goes to logic high when $V_C$ falls below LOW LIMIT REFERENCE.

To establish the HIGH LIMIT REFERENCE and the LOW LIMIT REFERENCE as respective adjustable fractions of A/C line voltage, an adjustable voltage divider network 254 is connected across the A/C lines $L_1$ and $L_2$. The outputs from the voltage divider network 254 accordingly follow flucuations in the A/C line voltage. A first voltage divider portion reduces line voltage to an intermediate level, and comprises fixed resistors 256 and 258. A rectifier diode 260 and filter capacitor 262 then provide a corresponding DC voltage on line 264, which DC voltage tracks the line voltage across $L_1$ and $L_2$. The line 264 is connected to a potentiometer 266.

A subsidiary voltage divider comprising three fixed resistors 268, 270 and 272 is connected to the tap point 274 of the potentiometer 266. The circuit node at the junction of resistors 268 and 270 supplies the HIGH LIMIT REFERENCE and is connected to the inverting (−) input of the comparator 250. The circuit node at the junction between resistors 270 and 272 is supplies the LOW LIMIT REFERENCE and is connected to the non-inverting (+) input of the comparator 252. Thus, HIGH LIMIT REFERENCE and LOW LIMIT REFERENCE have a fixed relationship with respect to each other, and an adjustable relationship with respect to line voltage determined by the setting of the tap point 274 of the potentiometer 266.

The circuit of FIG. 3 is adjusted such that the HIGH LIMIT REFERENCE is slightly above $V_C$ thirty seconds after the initial start.

Figure 4:
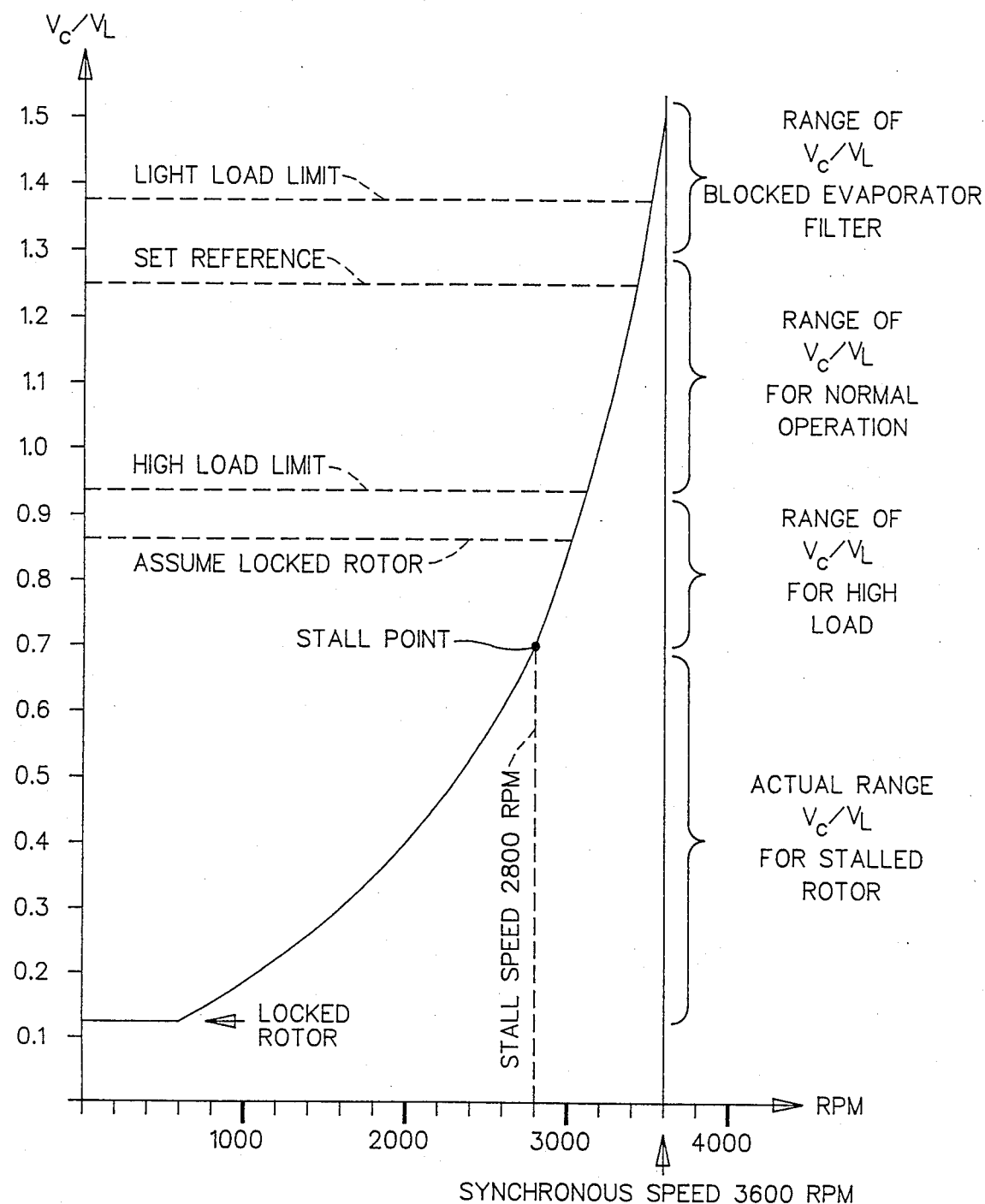
FIG. 4 is a typical plot of the ratio of capacitor-run winding voltage to line voltage as a function of compressor/motor RPM, and thus of loading.

It is believed that the principles of the invention will be better understood in view of a brief summary of certain characteristics of single-phase AC induction motors with reference to the plot of the accompanying FIG. 4.

Referring to FIG. 4, depicted is a typical plot of $V_C/V_L$ (compressor capacitor-run winding voltage $V_C$ normalized with respect to line voltage $V_L$) as a function of motor RPM for a two-pole AC induction motor having a synchronous speed of 3600 RPM. For such motors, useful motor performance is in a relatively narrow band between approximately 3500 RPM (light load) and 3200 RPM (heavy load). If the loading on the motor is increased beyond a certain level, the motor "stalls", consistently at approximately 2900 RPM. This figure applies at both high and low line voltage.

Significantly, the normalized voltage ratio $V_C/V_L$ provides a reliable and sensitive measure of motor RPM and thus motor loading for any practical range of line voltages. Moreover, there is a close correlation between motor heating and RPM, and between the $V_C/V_L$ ratio and RPM.

A refrigeration system characteristic employed in the calibration aspect the present invention is that the development of heavy loads on the compressor motor requires a substantial period of time to develop after initial startup, typically many minutes. The reason for this is that it takes several minutes to build up the high load pressures in the system across the capillary or expansion valve. The time is a direct result of the volume of the system and the restriction afforded by the capillary or expansion valve, as the case may be. This characteristic is used to establish a normalized capacitor-run winding reference when the system is first started.

Thus, at the factory, when the system has a known correct refrigerant charge and is operating under a known load, the reference is established, after approximately thirty seconds. At this time, the $V_C/V_L$ ratio represents a condition of temporary stability where there is a relatively light load in the motor, while pressures in the system are slowly building up. The thirty-second figure is exemplary only, and can be established non-critically within the range of five seconds to five minutes. The most important consideration is that the compressor motor has ceased to accelerate and is still lightly loaded, but is still loaded more than would be the case if refrigerant escaped from the system such that there is virtually no load on the compressor. Another consideration is that other start-up transients have dissipated.

In the particular example depicted in FIG. 4, the reference ratio $V_C/V_L$ is 1.25. To establish a light load limit, a $V_C/V_L$ ratio of 1.1 times the reference ratio is employed; in the example of FIG. 4, the light load limit is 1.1 times 1.25, which equals 1.375. While the absolute number for the light load limit (e.g. 1.375) will vary from system to system depending on the initial reference for each particular system, the factor 1.1 (or other appropriate factor which may be established based on experience) is fixed.

Similarly, to establish a high load limit, a $V_C/V_L$ ratio of 0.75 times the reference ratio is employed; in the example of FIG. 4, the high load limit is 0.75 times 1.25, which equals 0.9375. While the high load limit could also be employed to determine a locked-rotor condition several seconds after the start of each compressor ON cycle, in the particular embodiment described herein a separate limit is used for determining a locked rotor, this separate limit being 0.7 times the exemplary 1.25 $V_C/V_L$ reference ratio, which equals 0.875.

Figure 5A:
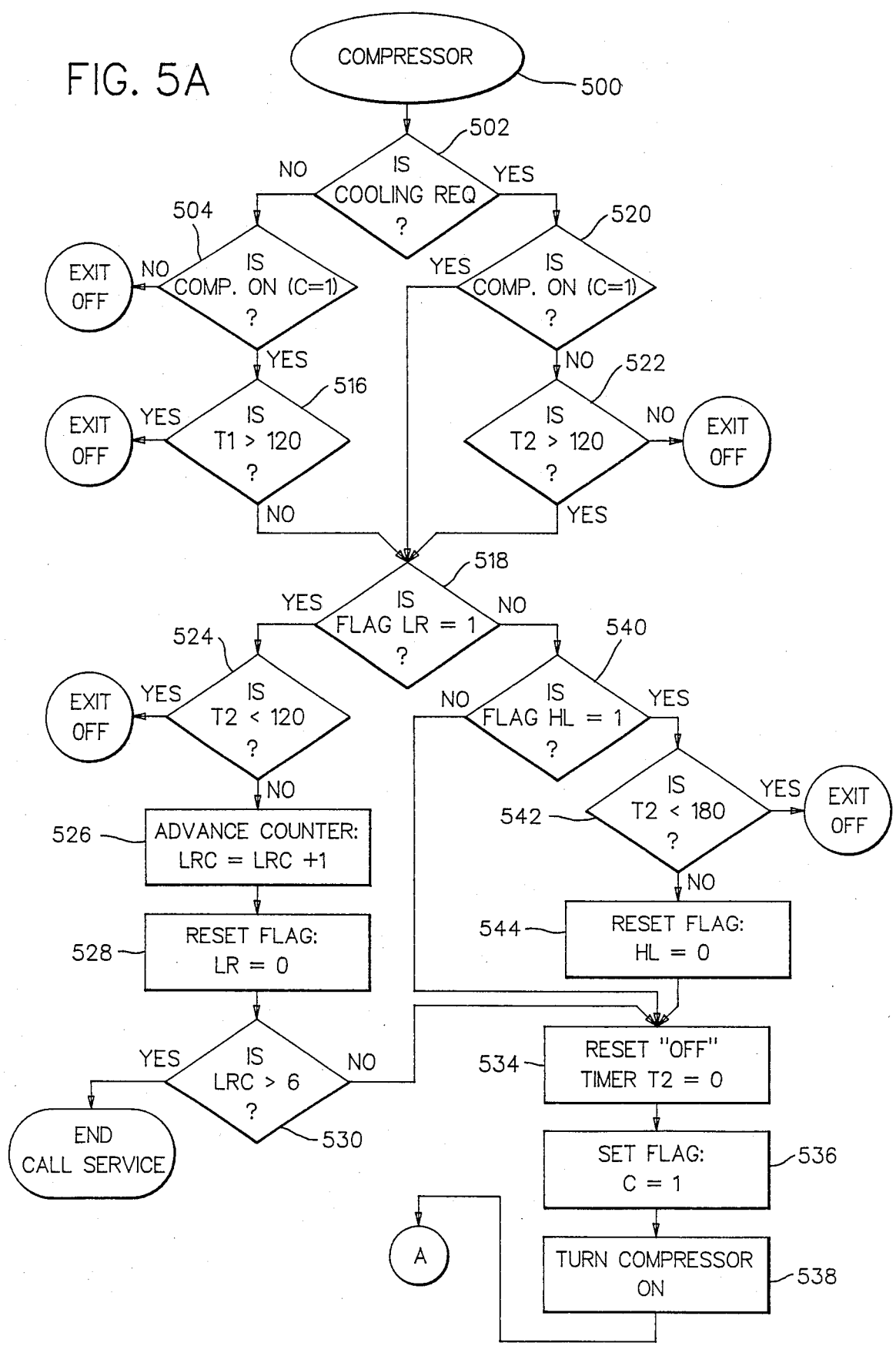
FIGS. 5A-5D comprise an exemplary program flowchart depicting a suitable compressor-protection algorithm for use in the practice of the invention.
Figure 5B:
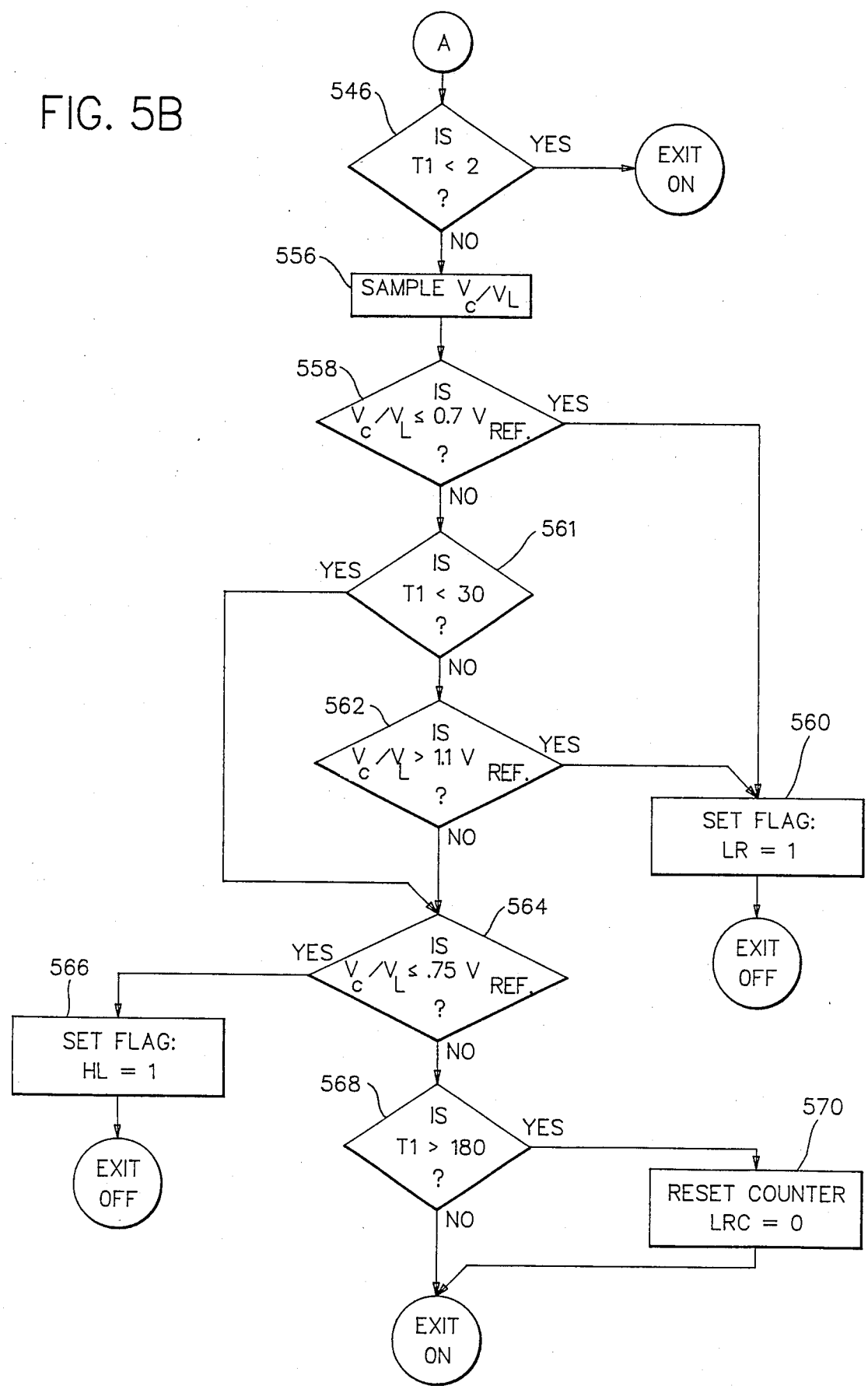
Figure 5C:
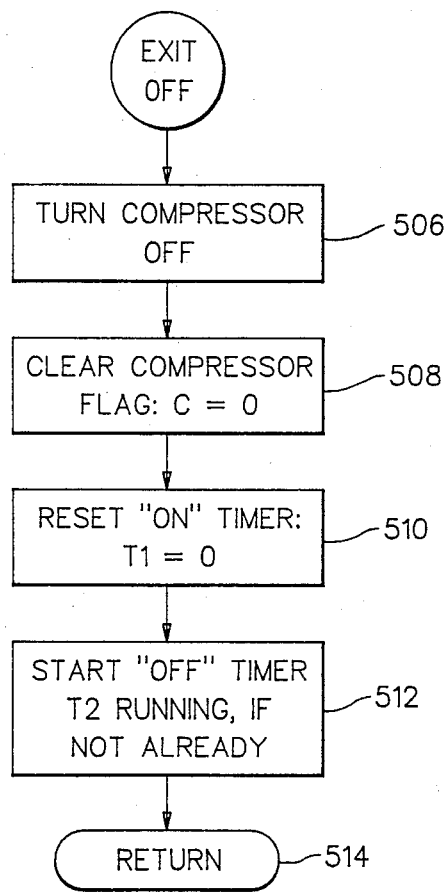
Figure 5D:
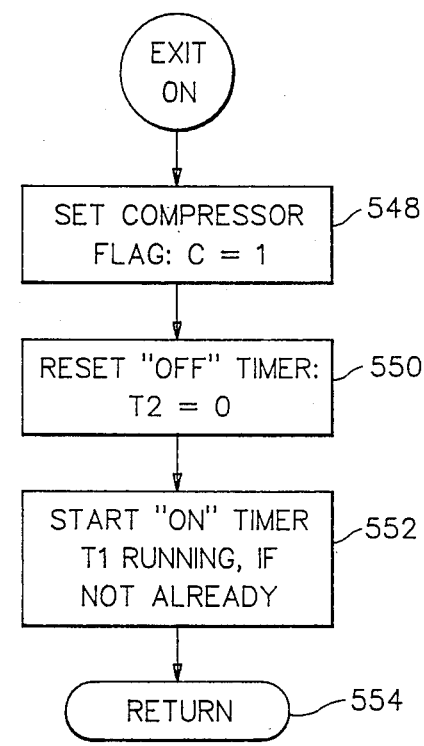

Referring now to FIGS. 5A-5D, shown is a typical program flowchart implemented in the microcontroller 200 of FIG. 2, for example. A similar flowchart (not shown) would apply to the circuit of FIG. 3. FIGS. 5A and 5B represent the main routine, while FIGS. 5C and 5D are subsidiary routines which are exited to from the flowchart of FIGS. 5A and 5B. For the purposes of FIGS. 5A and 5B, $V_L$ corresponds to A/C line voltage and $V_C$ corresponds to voltage across the capacitor-run winding 38 of the motor 26 driving the compressor 22.

It may be noted that one of the operations called for by the FIG. 5B flowchart is the sampling of the ratio $V_C/V_L$. It will be appreciated that this operation implies separately sampling, via the FIG. 2 A/D converter 218, both the capacitor-run winding voltage $V_C$ and the then-existing line voltage $V_L$, and performing the necessary division within the CPU of the microcontroller 200.

It will be appreciated that the routines of FIGS. 5A-5D are merely one part of an overall control program which continuously cycles each of a number of subroutines, including those of FIG. 5A-5D, in order to perform all of the control operations required for the refrigeration system, including those of thermostatic temperature control, with which the present invention is not particularly concerned. The overall cycle may occur many times per second such that, in view of the relative slowness of the control events involved in a refrigeration system, from the point of view of each subroutine, each subroutine is essentially continuously executed from its entry point. Thus, while waiting for a particular time interval to elapse, for example, a particular routine is exited if the interval has not yet elapsed. However, the routine is re-entered perhaps only a fraction of a second later. The effect from the point of view that particular routine is equivalent to a wait loop involving that routine alone.

Before considering the steps of the flowchart in detail, several flags, a variable and timers are defined in the following table.

| FLOWCHART FLAGS, VARIABLE AND TIMERS | |
|---|---|
| Flags | |
| C | Compressor. C=if OFF. C=1 if ON. |
| LR | Locked Rotor. LR=1 if locked rotor condition or high speed condition has been detected; otherwise LR=0. |
| HL | High Load. HL=1 if high load condition has been detected; otherwise HL=0. |
| Variable | |
| LRC | Locked Rotor Counter. Used to count restart attempts following locked rotor and high speed conditions. |
| Timers | |
| T1 | Accumulated compressor ON time in seconds since last reset of T1. Timer maintained by either software or hardware. |
| T2 | Accumulated compressor OFF time in seconds since last reset of T2. Timer maintained by either software or hardware. |

From the table above, it will be seen that the flag "LR" serves to record either a locked rotor condition or a high speed condition. This is done as a matter of convenience since the same control action is taken in either case, namely, a timed fault interruption followed by a restart, with a limited number of restarts before operation is entirely terminated for a service call.

Referring now to FIG. 5A in detail, the compressor routine begins at 500 which is entered over and over on a continuous basis whenever the system is in cooling mode.

At decision box 502, thermostat circuitry (not shown) is queried to determine whether cooling is required. If the answer in box 502 is "no", then decision box 504 is entered, which checks the compressor flag "C" to determine whether the compressor is ON. If the answer in box 504 is "no", i.e. if C=0, then the FIG. 5C EXIT OFF routine is entered.

Referring briefly to the FIG. 5C "EXIT OFF" routine, in box 506, the compressor is turned OFF, if it is not already. Then, in box 508, the compressor flag "C" is cleared to 0 in the event it is not already 0. Next, in box 510, the compressor "ON" timer T1 is reset to 0, if it is not 0 already. In box 512, the "OFF" timer T2 is started running if it is not already running. Finally, at box 514, the "compressor" routine is exited entirely so another part of the control program (not shown) can be executed, before execution returns to the FIG. 5A "compressor" routine.

Returning to FIG. 5A, if the answer in decision box 504 is "yes", then decision box 516 is entered, the purpose of which to avoid short-cycling of the compressor by forcing a two-minute minimum ON time (in the absence of a fault condition). Thus, in box 516, if the compressor "ON" timer T1 is greater than 120 seconds, the answer is "yes" and the routine is exited through "EXIT OFF". The minimum time has been satisfied.

If the answer in box 516 is "no", then the two-minute minimum on time has not been satisfied, and the compressor remains running. Execution then proceeds to decision box 518, described hereinbelow.

Returning to decision box 502, if the answer is "yes" indicating that cooling is required, then execution proceeds to decision box 520 which checks flag "C" to determine whether the compressor is already running. If the answer in box 520 is "yes" then execution proceeds directly to decision box 518.

If the answer in decision box 520 is "no", then decision box 522 is entered which forces a two-minute minute off time also to avoid short cycling, as a complement to decision box 516 which forces a two-minute minimum on time. More particuarly, in box 522, the compressor "OFF" timer T2 is checked to ensure the compressor has been OFF for at least two minutes before the rest of the routine of FIGS. 5A and 5B is allowed to execute, which will have the effect of eventually turning the compressor on. Thus, if the answer in box 522 is "no", control passes to the "EXIT OFF" routine. A loop is thus effectively established, whereby execution continuously returns to box 522 until such time as two minutes of accummulated OFF time have elapsed, and the answer in box 522 becomes "yes". If (or when) the answer in box 522 is "yes", execution proceeds to decision box 518.

In box 518, flag "LR" is checked, which will be set if either a locked rotor condition or a high speed condition has previously been detected. If the answer in box 518 is "yes", then box 524 is entered which establishes a two-minute cool down interval using the compressor "OFF" timer T2. If the accummulated "OFF" time is less than two minutes, then the answer in box 524 is "yes", and execution passes to "EXIT OFF". A loop is thus established, whereby execution continuously returns to box 524 until such time as two minutes have elapsed, and the answer in box 524 is accordingly "no".

At this point, the counter LRC is advanced by one in box 526 and the flag LR is reset to 0 in box 528.

In order to terminate operation completely in the event that a locked rotor or high speed condition has been detected more than six times and has not been cleared, in decision box 530 the counter LRC is compared to the number 6. If LRC is greater than 6, then the answer in box 530 is "yes", and control passes to box 532 which terminates operation entirely until the system is serviced by a technician.

If the answer in box 530 is "no" then the compressor can be restarted. Accordingly, in box 534, the "OFF" timer T2 is reset to 0, in box 536 the compressor flag C is set to 1, and in box 538, the compressor is turned ON.

Returning to decision box 518, if the flag "LR" is not set, then the answer is "no", and execution proceeds to decision box 540 where the flag "HL" is checked to determine whether a high load condition has previously been detected. If the answer in box 540 is "no", then control passes to box 534, leading to the compressor being turned ON as described just above.

If in decision box 540 it is determined that "yes" the flag "HL" is set, then decision box 542 is entered which establishes a three-minute cool down interval before the compressor is allowed to restart. In a manner similar to that of the two-minute cool down interval of box 524 described above, a loop is effectively established through decision box 542 until such time as three minutes of compressor OFF time have elapsed and the answer is "no". At this point, the flag "HL" is reset in box 544 and execution proceeds through boxes 534, 536 and 538 whereby the compressor is turned ON.

The flowchart continues through point "A" at the top of FIG. 5B, with decision box 546 which delays any further tests for a two-second interval during which a compressor is given time to come up to an initial equilibrium speed. Thus, a loop is effectively established through decision box 546 and the FIG. 5D "EXIT ON" routine until two seconds have elapsed, and the answer in decision box 546 is "no".

Briefly considering the FIG. 5D "EXIT ON" routine, in box 548, the compressor flag "C" is set to 1 if it is not already, and the compressor "OFF" timer T2 is reset to 0 in box 550 if it is not already. Then, in box 552, the "ON" timer T1 is started running if it is not already. Finally, in box 554, a return is made to the remainder of the overall controlled program (not shown).

Returning to FIG. 5B, if at least two seconds have elapsed since the compressor was started, box 556 is entered where the prevailing ratio of $V_C/V_L$ is sampled, for comparison against the reference voltage, stored for example in the FIG. 2 non-volatile RAM 202, or established by the setting of the FIG. 2 calibration potentiometer 242. It will be appreciated that the reference voltage is established as part of the factory calibration procedure for the particular unit, as described hereinabove.

In decision box 558 a locked-rotor test is done by determining whether the ratio $V_C/V_L$ is less than 0.7 times $V_{REF}$. If the answer is "yes", then in box 560 the flag "LR" is set to 1, and execution proceeds to "EXIT OFF". As already described above with reference to FIG. 5A, the flag "LR" is utilized by decision boxes 518, 524 and 530 to establish a two-minute cool down interval, and a limited restart count.

If the motor/compressor has reached a speed such that it can be concluded that the rotor is not locked, then the answer in box 558 is "no", and decision box 561 is entered, the purpose of which is bypass the high speed test of box 562 until the compressor has been running for at least thirty seconds such that there is at least a normal light load on the compressor, assuming there is a normal amount of refrigerant in the system.

Decision box 562 thus performs a high speed test by determining whether the ratio $V_C/V_L$ is greater than 1.1 times the reference voltage $V_{REF}$. If the answer in box 562 is "yes" indicative of an excessively light load on the compressor as would result from a loss of refrigerant or possibly blocked evaporator airflow, then box 560 is entered to set flag "LR" to 1 and to turn OFF the compressor through the "EXIT OFF" routine.

If the answer in box 562 is "no", then decision box 564 is entered which tests for a high load on the compressor by determining whether the ratio $V_C/V_L$ is less than or equal to 0.75 times $V_{REF}$. If the answer is "yes", then the flag "HL" is set to 1 in box 566, and the compressor is de-energized through the "EXIT OFF" routine.

As described above with reference to FIG. 5A, the flag "HL" is used in decision boxes 540 and 542 to establish a threeminute cool down interval, and then a compressor restart. There is no restart count in the case of a high load condition (in contrast to a locked rotor condition).

If the high load test of box 564 of FIG. 5B is satisfied, then the answer is "no", and decision box 568 is entered to determine whether the compressor has run for at least three consecutive minutes without a fault. If the answer is "yes", then box 570 is entered to clear the counter LRC to zero, such that the full six restart attempts will be allowed in the event of subsequent locked rotor or high speed conditions. The routine is then exited via "EXIT ON".

While specific embodiments of the invention have been illustrated and described herein, it is realized that numerous modifications and changes will occur to those skilled in the art. It is therefore to be understood that the appended claims are intended to cover all such modifications and changes which fall within the true spirit and scope of the invention.

What is claimed is:

1. A calibrated method used in protecting a refrigerant compressor in a closed-circuit refrigeration system against loss of refrigerant and overload conditions independent of compressor and system size, the compressor being driven by a single-phase induction motor supplied from an AC power line and of the type including a capacitor-run winding, the refrigeration system having a condenser and an evaporator connected in series with the compressor, and the refrigeration system being cycled ON and OFF during operation, said method comprising:

establishing a permanent compressor motor reference ratio when the refrigeration system has a known correct refrigerant charge and the motor/compressor has a known load by sensing the ratio of capacitor-run winding voltage to line voltage, and storing at least a representation of the sensed ratio as the permanent compressor motor reference ratio; and thereafter, during each ON cycle, at least periodically sensing the prevailing ratio of capacitor-run winding voltage to line voltage, recognizing a low load condition indicative of a loss of refrigerant or of insufficient evaporator airflow if the prevailing ratio exceeds a low load threshold ratio established as a first predetermined function of the permanent reference ratio, and recognizing a high load condition indicative of an excessive load on the motor/compressor if the prevailing ratio is less than a high load threshold ratio established as a second predetermined function of the permanent reference ratio.

2. A method in accordance with claim 1, which further comprises determining whether the motor/compressor has failed to start at the beginning of an ON cycle by:

allowing a compressor motor equilibrium speed interval to elapse; and then sensing the prevailing ratio of capacitor-run winding voltage to line voltage, and de-energizing the motor/compressor if the prevailing ratio is less than the high load threshold ratio.

3. A calibrated control system used in protecting a refrigerant compressor in a closed-circuit refrigeration system against loss of refrigerant and overload conditions independent of compressor and system size, the compressor being driven by a single-phase induction motor supplied from an AC power line and of the type including a capacitor-run winding, and the refrigeration system having a condenser and an evaporator connected in series with the compressor, said control system comprising:

a switching element for cycling the refrigeration system ON and OFF by energizing and de-energizing the compressor motor;

sensing means for sensing the ratio of capacitor-run winding voltage to AC line voltage;

a storage element for storing a permanent compressor motor reference ratio established as the ratio of capacitor-run winding voltage to line voltage when the refrigeration system has a known correct refrigerant charge and the motor/compressor has a known load;

means connected to said sensing means and said switching element for, during each ON cycle, at least periodically sensing the prevailing ratio of capacitor-run winding voltage to line voltage, recognizing a low load condition indicative of a loss of refrigerant or of insufficient evaporator airflow and de-energizing the compressor motor if the prevailing ratio exceeds a low load threshold ratio established as a first predetermined function of the permanent reference ratio, and recognizing a high load condition indicative of an excessive load on the motor/compressor and de-energizing the compressor motor if the prevailing ratio is less than a high load threshold ratio established as a second predetermined function of the permanent reference ratio.

4. A control system in accordance with claim 3, wherein said storage element comprises an adjustable potentiometer.

5. A control system in accordance with claim 3, wherein said storage element comprises a digital memory.

6. A calibrated control system in accordance with claim 3, which further comprises means for determining whether the compressor motor has failed to start at the beginning of an ON cycle by:

allowing a compressor motor equilibrium speed interval to elapse; and de-energizing the compressor motor if the prevailing ratio of capacitor-run winding voltage to line voltage is below the high load threshold loading.

* * * * *